United States Patent [19]

Detournay et al.

[11] Patent Number: 4,567,027

[45] Date of Patent: Jan. 28, 1986

[54] PROCESS FOR DEFLUORINATING AN ACID SULPHATE SOLUTION

[75] Inventors: Jacquy J. C. Detournay, Overpelt; Jozef V. M. Sterckx, Neerpelt, both of Belgium

[73] Assignee: Metallurgie Hoboken-Overpelt, Hoboken, Belgium

[21] Appl. No.: 631,168

[22] Filed: Jul. 16, 1984

[30] Foreign Application Priority Data

Jul. 19, 1983 [LU] Luxembourg ............................ 84923

[51] Int. Cl.$^4$ ............................................... C01G 9/06
[52] U.S. Cl. .................................... 423/101; 210/710; 210/724; 210/737; 210/915; 423/301; 423/465
[58] Field of Search ............... 210/710, 723, 724, 726, 210/737, 915; 75/109; 423/101, 104, 301, 465, 490

[56] References Cited

U.S. PATENT DOCUMENTS

| | | | |
|---|---|---|---|
| 2,772,230 | 11/1956 | Hollander et al. | 423/101 |
| 3,311,447 | 3/1967 | Stuart | 423/101 |
| 3,652,264 | 3/1972 | Bodson | 75/108 |
| 3,800,024 | 3/1974 | Forsell et al. | 423/55 |
| 4,028,237 | 6/1977 | Nishimura et al. | 210/915 |

FOREIGN PATENT DOCUMENTS

| | | | |
|---|---|---|---|
| 434843 | 5/1971 | Australia. | |
| 50-47456 | 4/1975 | Japan | 210/915 |
| 10553 | 1/1978 | Japan. | |
| 55-3802 | 1/1980 | Japan | 210/915 |

OTHER PUBLICATIONS

*Chemical Abstracts*, vol. 95, 45456f, 1981, p. 131.
*Chemical Abstracts*, vol. 87, 11427s, 1977, p. 362.
*Chemical Abstracts*, vol. 99, 200077m, 1983, p. 308.
*Chemical Abstracts*, vol. 87, 206078m, 1977, p. 259.
*Chemical Abstracts*, vol. 89, 7983u, 1978, p. 277.
*Chemical Abstracts*, vol. 83, 62792g, 1975, p. 269.
*Chemical Abstracts*, vol. 89, 94693r, 1978, p. 285.
*Chemical Abstracts*, vol. 78, 86695a, 1973, p. 141.

*Primary Examiner*—Peter Hruskoci
*Attorney, Agent, or Firm*—Fred Philpitt

[57] ABSTRACT

A process for defluorinating a solution of a sulphate of Zn, Ni, Cd, Mn and/or Mg, in which $Al^{3+}$ and $PO_4^{3-}$ ions are added to the solution, then the solution is neutralized up to a pH higher than 4 and lower than that one that causes a substantial precipitation of Zn, Ni, Cd, Mn and/or Mg, thereby producing a fluorinated precipitate, and the precipitate is separated from the solution.

11 Claims, No Drawings

PROCESS FOR DEFLUORINATING AN ACID SULPHATE SOLUTION

The present invention relates to a process for separating $F^-$ ions from an acid aqueous solution of at least one sulphate chosen among $ZnSO_4$, $NiSO_4$, $CdSO_4$, $MnSO_4$ and $MgSO_4$.

The process of the invention is particularly useful for defluorinating an acid zinc sulphate solution.

It is well known that, in electrolytic zinc extraction, the presence of fluorine at a concentration of some tens of milligrams per liter in the zinc sulphate solutions is highly detrimental to the good running of operations, in particular to the nature and the aspect of the cathodic deposit, the faradaic yield and the corrosion phenomena. Hence, it is highly wishful to send to the tankhouse solutions having only a few milligrams of fluorine per liter.

Now, the acid solutions from the leaching of zinc ores always contain substantial quantities of ions that form stable complexes with $F^-$ ions, such as $Fe^{3+}$ and $Sn^{2+}$ ions. In these circumstances the presence of cations such as $Ca^{2+}$ and $Ba^{2+}$, the fluorides of which present a small solubility product, does not allow to restrict the $F^-$ ion content to some milligrams per liter, even in favourable acidity conditions compatible with the presence of $Zn^{2+}$ ions. So, by neutralizing an acid $ZnSO_4$ solution containing more than about 0.5 g/l of $F^-$ by $CaCO_3$ up to pH 4.5–4.6 (where zinc is still soluble), a solution with about 0.5 g/l of $F^-$ is obtained, whatever the initial fluorine concentration is.

Until now, zinc ores with a high fluorine content had to be defluorinated by thermic way, before being sent to the leaching.

The aim of the present invention is to provide a process such as defined hereinbefore, which enables to obtain a solution with a low $F^-$ content.

According to the invention, $Al^{3+}$ and $PO_4^{3-}$ ions are, if necessary, added to the solution so that the latter contains at least about 1 g/l of $Al^{3+}$ and at least about 3.5 g/l of $PO_4^{3-}$, the solution is then neutralized up to a pH higher than 4 and lower than that one that causes a substantial precipitation of Zn, Ni, Cd, Mn and/or Mg in the form of hydroxide and/or basic salt, thereby producing a fluorinated precipitate, and the precipitate is separated from the solution, thereby producing a partially defluorinated solution.

It should be noted that there are already processes known for defluorinating solutions of sodium sulphate, well waters and wastewaters, according to which $Al^{3+}$ ions are added to the solution, then the solution is neutralized up to a pH of at least 5.5, thereby producing a fluorinated precipitate that is separated from the solution (see Chemical Abstracts, vol. 95, 1981, p. 131, abstract 45456f; vol. 87, 1977, p. 362, abstract 11427s; vol. 99, 1983, p. 308, abstract 200077m; vol. 87, 1977, p. 259, abstract 206078m; vol. 89, 1978, p. 277, abstract 79834u; see also the published Japanese patent application No. 10553/1978). This known processes are not suited for defluorinating zinc sulphate solutions, as there is already a substantial precipitation of zinc at pH 5.5.

In the process of the invention it is necessary to operate with at least about 1 g/l of $Al^{3+}$ and at least about 3.5 g/l of $PO_4^{3-}$ to obtain a sensible defluorination of the solution. For economical reasons it is recommended to operate with less than about 5 g/l of $Al^{3+}$ and less than about 17.5 g/l of $PO_4^{3-}$.

Very good results are obtained, when the $Al^{3+}$ ion concentration of the solution is comprised between about 2.5 and 3.5 g/l and the $PO_4^{3-}$ ion concentration between about 8.75 and 12.25 g/l, the solution containing preferably stoechiometric quantities of $Al^{3+}$ and $PO_4^{3-}$.

It is necessary to neutralize up to a pH higher than 4 to obtain a satisfying defluorination of the solution. It is obvious that the pH that causes a substantial precipitation, e.g. a precipitation of 10%, of the Zn, Ni, Cd, Mn and/or Mg in the form of hydroxide and/or basic salt depends in the first place on the composition of the solution. That pH depends also on the neutralizing conditions: dilution of the neutralizing agent, rate of addition of the neutralizing agent, etc. It is also obvious that that pH can be easily determined experimentally for each particular solution. Normally that pH is about 5 in $ZnSO_4$ solutions, about 5.5 in $NiSO_4$ solutions, about 6.5 in $CdSO_4$ and $MnSO_4$ solutions, and about 7.5 in $MgSO_4$ solutions. With $ZnSO_4$ solutions the best results are obtained when neutralizing up to a pH of between about 4.3 and 4.7.

Though any neutralizing agent such as NaOH or KOH could be used, neutralization is advantageously carried out with CaO, $Ca(OH)_2$ and/or $CaCO_3$, these being cheap reagents that do not contaminate the solution, calcium being precipitated as a sulphate.

Neutralization is advantageously done at a temperature between 45° and 90° C. Below 45° C. the filtrability of the precipitate becomes bad and above 90° C. the defluorination of the solution becomes markedly less good. The best results are obtained when neutralizing at a temperature of 50°–55° C.

When the aforementioned partially defluorinated solution has still a too high $F^-$ ion content, this solution has to be acidified and then treated by the process of the invention. It is enough to acidify to a pH, where the aforementioned $Al^{3+}$ and $PO_4^{3-}$ concentrations are possible. It is clear that the acidification and adjustment of the $Al^{3+}$ and/or $PO_4^{3-}$ concentrations can be carried out in one single operation, for instance by adding phosphoric acid. When the aforesaid acidified solution is treated by the process of the invention, a fluorinated precipitate is produced again. It is then indicated to use this second fluorinated precipitate to adjust the $Al^{3+}$ and $PO_4^{3-}$ content of an acid sulphate solution that still has to be defluorinated by the process of the invention.

Hence, it may be necessary to carry out a double defluorination according to the process of the invention to obtain a solution with less than 0.005 g/l $F^-$. In the first step of this double defluorination the fluorinated precipitate obtained in the second step of a previous double defluorination is dissolved in the solution to be defluorinated and after neutralization one obtains a highly fluorinated precipitate which is discarded, and a partially defluorinated solution. In the second step this partially defluorinated solution is acidified and its $Al^{3+}$ and $PO_4^{3-}$ content is adjusted and after neutralizing one obtains a weakly fluorinated precipitate (the aforesaid second fluorinated precipitate), which will be used in the first step of a subsequent operation of double defluorination, and a practically defluorinated solution.

When the $F^-$ ion content of the solution to be defluorinated is not higher than about 0.5 g/l, a double defluorination according to the process of the invention is enough to obtain a solution with less than 0.005 g/l $F^-$. When the $F^-$ ion content of the solution to be defluorinated is higher than about 0.5 g/l, for instance ranging about 1 g/l, a double defluorination according to the process of the invention may be no longer enough to obtain a solution with less than 0.005 g/l of $F^-$. In that case it may be necessary to carry out a triple defluorination according to the process of the invention, which would be expensive on account of the reagents.

Hence, it is not indicated to treat according to the process of the invention solutions with a $F^-$ ion content that is higher than about 0.5 g/l. If such solutions have to be treated, their $F^-$ ion content will first be lowered to about 0.5 g/l by neutralizing them with a calciferous neutralizer, for instance $CaCO_3$, up to a pH of between 4 and 5, preferably between 4.5 and 4.6 (see above) before submitting them to the process of the invention.

EXAMPLE 1

A series of 17 $ZnSO_4$ solutions with different $Al^{3+}$, $PO_4^{3-}$ and $F^-$ contents are neutralized by $CaCO_3$ up to pH 4.5.

The table hereafter gives for each solution:
 the initial $Al^{3+}$ content in g/l
 the form in which $PO_4^{3-}$ is present in the initial solution and the molar ratio $PO_4^{3-}$: $Al^{3+}$ in the solution
 the neutralizing temperature in C°
 the initial $F^-$ content in g/l
 the final $F^-$ content in g/l

TABLE

| | $Al^{3+}$ in g/l | $PO_4^{3-}$ (a) form (b) $PO_4^{3-}$:$Al^{3+}$ | temp. °C. | initial $F^-$ in g/l | final $F^-$ in g/l |
|---|---|---|---|---|---|
| 1 | — | (a) $H_3PO_4$ (equivalent to 3 g/l $Al^{3+}$) | 50 | 0,948 | >0,400 |
| 2 | 3 | — | 50 | 0,184 | 0,072 |
| 3 | 5 | (a) $Na^+$ salt (b) 1:1 | 50 | 0,776 | 0,020 |
| 4 | 5 | (a) $H_3PO_4$ (b) 1:1 | 50 | 0,776 | 0,018 |
| 5 | 4 | (a) $H_3PO_4$ (b) 1:1 | 50 | 0,736 | 0,033 |
| 6 | 3 | (a) $H_3PO_4$ (b) 1:1 | 50 | 0,736 | 0,044 |
| 7 | 2 | (a) $H_3PO_4$ (b) 1:1 | 50 | 0,736 | 0,120 |
| 8 | 5 | (a) $H_3PO_4$ (b) 1:1 | 50 | 1,368 | 0,172 |
| 9 | 5 | (a) $H_3PO_4$ (b) 4:10 | 50 | 1,368 | 0,311 |
| 10 | 5 | (a) $H_3PO_4$ (b) 2:10 | 50 | 1,368 | 0,408 |
| 11 | 5 | (a) $Na^+$ salt (b) 1:1 | 50 | 0,776 | 0,017 |
| 12 | 5 | (a) $Na^+$ salt (b) 1:1 | 90 | 0,776 | 0,080 |
| 13 | 3 | (a) $H_3PO_4$ (b) 1:1 | 50 | 1,44 | 0,100 |
| 14 | 3 | (a) $H_3PO_4$ (b) 1:1 | 50 | 0,535 | 0,030 |
| 15 | 3 | (a) $Al^{3+}$ salt (b) 1:1 | 50 | 0,530 | 0,025 |
| 16 | 3 | (a) $H_3PO_4$ (b) 1:1 | 50 | 0,184 | 0,012 |
| 17 | 3 | (a) $H_3PO_4$ (b) 1:1 | 50 | 0,030 | >0,005 |

From the abovementioned table appears the following:

In a solution containing $PO_4^{3-}$ ions and free of $Al^{3+}$ ions (solution 1) one obtains a defluorination, which is not better than the one obtained by neutralizing solutions free of $Al^{3+}$ by means of $CaCO_3$ (see above).

The defluorination obtained in a solution containing $Al^{3+}$ and $PO_4^{3-}$ ions is substantially better than the one obtained in a solution containing $Al^{3+}$ ions and no $PO_4^{3-}$ ions (solution 16 versus solution 2). The form in which $PO_4^{3-}$ is present in the solution is unimportant (solutions 3, 4 and 11). The favourable effect of the $PO_4^{3-}$ ions decreases when the molar ratio $PO_4^{3-}$: $Al^{3+}$ becomes smaller (solutions 8-10). Defluorination is less good at high temperature (solutions 11-12). By extrapolating the results obtained with the solutions 4-7 it will be observed that a sensible defluorination may be expected from an $Al^{3+}$ concentration of 1 g/l and an equivalent $PO_4^{3-}$ concentration.

Starting from an initial $F^-$ concentration of about 0.5 g/l, i.e. the one obtained by neutralizing solutions free of $Al^{3+}$ by means of $CaCO_3$, it is possible to obtain a final $F^-$ concentration of less than 0.005 g/l by a double defluorination making use of a 3 g/l $Al^{3+}$ concentration and an equivalent $PO_4^{3-}$ concentration (solutions 14 and 17).

It should be noted that the fluorinated precipitate formed in the solution containing $Al^{3+}$ ions and free of $PO_4^{3-}$ ions is difficult to filter contrarily to those formed in solutions containing both $Al^{3+}$ and $PO_4^{3-}$ ions.

EXAMPLE 2

One liter of a zinc sulphate solution of pH 2 and containing in g/l: 93.4 Zn, 0.1 Cu, 0.1 Cd, 0.1 Sn, 0.5 Al, 2.4 Fe, 1.84 F, is neutralized at 50° C. up to pH 4.5 by adding 5 g of $CaCO_3$. A fluorinated precipitate is formed.

After separation of the precipitate a 0.5 g/l $F^-$ solution is obtained. To this solution are added 65 ml of an aluminium sulphate solution with 40 g/l Al and 7.9 g $P_2O_5$ as orthophosphoric acid. The whole is neutralized at 50° C. up to pH 4.5 by addition of 50 g of $CaCO_3$. A fluorinated precipitate is formed.

After separation of the precipitate a solution is obtained containing in g/l: 91 Zn, 0.1 Cu, 0.1 Al, <0.01 $PO_4^{3-}$ and <0.03 F. The precipitate contains in %: 16.4 Ca, 2.8 Al, 9.2 $PO_4^{3-}$, 0.4 F and 5 Zn.

EXAMPLE 3

One proceeds in the same way as in example 2, but instead of carrying out the second neutralizing at 50° C., it is carried at 90° C.

The final solution contains now 0.05 g/l F, but the filtrability of the precipitate is better than in example 2.

EXAMPLE 4

75 ml of an aluminium sulphate solution with 40 g/l Al and 7.9 g $P_2O_5$ as orthophosphoric acid are added to one liter of a $ZnSO_4$ solution of pH 4.5 containing in g/l: 91 Zn, 0.045 F, 0.1 Cu, 0.1 Cd, 0.1 Al. The whole is neutralized at 50° C. up to pH 4.5 by addition of 50 g $CaCO_3$. A fluorinated precipitate is formed.

After separation of the precipitate, a solution is obtained with 90 g/l Zn, <0.005 g/l F, 0.1 g/l Al and <0.01 g/l $PO_4^{3-}$.

EXAMPLE 5

10 g of concentrated $H_2SO_4$ and the precipitate obtained in example 4 are added to one liter of a $ZnSO_4$ solution of pH 4.5 containing in g/l: 93.6 Zn, 0.5 F, 0.1 Cu, 0.1 Cd, 0.1 Sn, 0.5 Al. The whole is neutralized at 50° C. up to pH 4.5 by addition of 22 g $CaCO_3$.

The neutralized solution contains in g/l: 91 Zn, <0.03 F, 0.1 Al, 0.1 Cu, 0.1 Cd, 0.1 Sn.

We claim:

1. A process for separating $F^-$ ions from an acid aqueous solution of $ZnSO_4$, comprising the steps of
   (a) adding $Al^{3+}$ and $PO_4^{3-}$ ions to the solution so that the solution contains at least about 1 g/l of $Al^{3+}$ and at least about 3.5 g/l of $PO_4^{3-}$;
   (b) neutralizing the solution up to a pH higher than 4 and lower than about 5 and a temperature of between about 45° and 90° C. thereby producing a fluorinated precipitate, and
   (c) separating said fluorinated precipitate from the solution, thereby producing a partially defluorinated solution.

2. The process according to claim 1 wherein in step (a) the $Al^{3+}$ ion concentration is adjusted to a value of less than about 5 g/l and the $PO_4^{3-}$ ion concentration to a value less than about 17.5 g/l.

3. The process according to claim 2 wherein the $Al^{3+}$ ion concentration is adjusted to a value of between about 2.5 and 3.5 g/l and the $PO_4^{3-}$ ion concentration to a value between about 8.75 and 12.25 g/l.

4. The process according to claim 1 wherein in step (a) the $PO_4^{3-}$ ion concentration of the solution is adjusted so that the solution contains stoichiometric amounts of $Al^{3+}$ and $PO_4^{3-}$ ions.

5. The process according to claim 1 wherein neutralization is carried out up to a pH of between about 4.3 and 4.7.

6. The process according to claim 1 wherein neutralization is carried out by means of at least one compound chosen from the group consisting of $CaO$, $Ca(OH)_2$ and/or $CaCO_3$.

7. The process according to claim 1 wherein neutralization is carried out at a temperature ranging from 50° to 55° C.

8. The process according to claim 1 wherein said partially defluorinated solution is acidified and this acidified solution is treated by said steps a–c, thereby producing a second fluorinated precipitate and a nearly defluorinated solution.

9. The process according to claim 8 wherein said second fluorinated precipitate is dissolved in an acid sulphate solution to be defluorinated by said steps a–c.

10. The process according to claim 1 wherein a solution with a $F^-$ ion concentration equal or lower than about 0.5 g/l is used as the acid sulphate solution to be defluorinated.

11. The process according to claim 10 wherein the solution with a $F^-$ ion concentration equal to about 0.5 g/l is prepared from a solution with a higher $F^-$ ion concentration by neutralizing this latter solution with a calcium-containing neutralizer up to a pH of between 4 and 5, thereby forming a fluorinated precipitate by separating this precipitate from the solution and by acidifying the solution from which the precipitate was separated.

* * * * *

UNITED STATES PATENT AND TRADEMARK OFFICE
CERTIFICATE OF CORRECTION

PATENT NO. : 4,567,027
DATED : January 28, 1986
INVENTOR(S) : DETOURNAY et al

It is certified that error appears in the above—identified patent and that said Letters Patent is hereby corrected as shown below:

Col. 3, Line 57, "$>0,005$" should be --- $<0,005$ ---.

Signed and Sealed this

Twenty-seventh Day of May 1986

[SEAL]

Attest:

DONALD J. QUIGG

Attesting Officer

Commissioner of Patents and Trademarks